Dec. 30, 1958     S. H. GIBSON     2,866,521
LOCOMOTIVE FLANGE LUBRICATOR
Filed Dec. 1, 1955
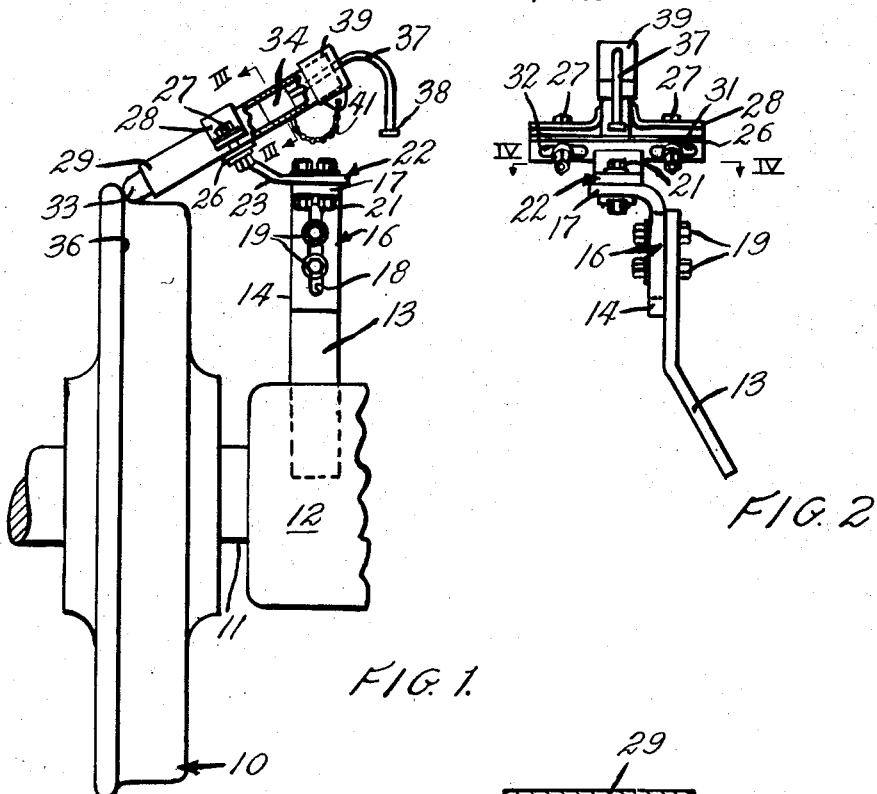
FIG. 1.
FIG. 2.
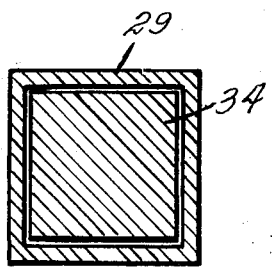
FIG. 3.
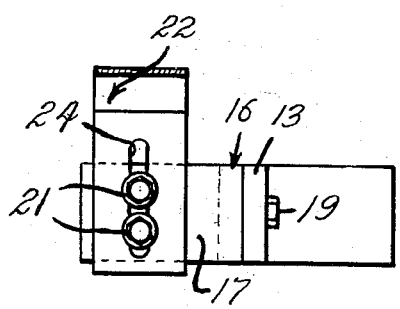
FIG. 4.
INVENTOR.
SEABRON H. GIBSON
BY
ATTORNEYS

United States Patent Office 2,866,521
Patented Dec. 30, 1958

2,866,521

LOCOMOTIVE FLANGE LUBRICATOR

Seabron H. Gibson, Birmingham, Ala., assignor to Transall Incorporated, a corporation of Alabama Application December 1, 1955, Serial No. 550,399

1 Claim. (Cl. 184—3)

This invention relates to a locomotive flange lubricator and has for an object the provision of means for holding a tube containing a solid type lubricant stick in a fixed position relative to the flange to be lubricated, whereby the lubricant is properly applied to the surface to be lubricated.

A more specific object of my invention is to provide an improved holder for a tube containing a solid type lubricant stick which may be readily adjusted to vary the position of contact between the lubricant stick and the flange to be lubricated.

A further object of my invention is to provide a locomotive flange lubricator of the character designated in which the lubricant stick moves axially toward the flange without rotation, thereby assuring that the contour of the contact end of the stick corresponds at all times to the contour of the flange to be lubricated.

A still further object of my invention is to provide a flange lubricator of the character designated which shall be simple of construction, economical of manufacture and one which may be easily mounted on existing locomotives.

A flange lubricator embodying features of my invention is illustrated in the accompanying drawing, forming a part of this application, in which:

Fig. 1 is a side elevational view of the lubricator, partly broken away and in section, showing the manner in which the same is mounted on a journal box positioned outwardly of the locomotive wheel;

Fig. 2 is a front elevational view of the lubricator, showing the same removed from the journal box;

Fig. 3 is an enlarged detail sectional view taken generally along the line III—III of Fig. 1; and, Fig. 4 is a detail sectional view taken generally along the line IV—IV of Fig. 2.

Referring now to the drawing for a better understanding of my invention, I show a locomotive wheel 10 which might be one of the leading or one of the trailing wheels of the locomotive. Preferably, one lubricator will be mounted adjacent each of the leading and perhaps adjacent each of the trailing wheels of the locomotive. The wheel 10 is mounted on the usual axle 11 which is mounted for rotation in a journal box 12 positioned outwardly of the wheel, as shown in Fig. 1.

Mounted rigidly on the journal box 12 by any suitable means, such as by welding, is an upstanding support bracket 13. Extending downwardly alongside the upstanding bracket 13, as shown in Fig. 2, is a depending leg 14 of an L-shaped bracket 16. The uppermost leg 17 of the L-shaped bracket 16 extends in a substantially horizontal plane. An elongated vertically extending slot 18 is provided in the leg 14 for receiving suitable fastening means, such as bolts 19, which pass through suitable openings provided in the upper end of the support bracket 13.

Mounted on top of the horizontal leg 17 by suitable fastening means, such as bolts 21, is a support member 22 having an upwardly directed inner end 23, as shown in Fig. 1. An elongated longitudinally extending slot 24 is provided in the member 22 for receiving the bolts 21 whereby the position of the member 22 relative to the L-shaped bracket 16 may be adjusted.

Secured to the inner end of the member 22 and extending transversely thereof is a support member 26. Mounted on the support member 26 by means of bolts 27 is a clamp 28 having a U-shaped central portion for receiving a tube member 29. Elongated, longitudinally extending slots 31 and 32 are provided in the member 26 for receiving the bolts 27 whereby the position of the clamp 28 relative to the support member 26 may be adjusted.

As shown in Fig. 3, the tube member 29 is polygonal, preferably square, as viewed in transverse cross section, for receiving a solid type lubricant stick 33 having a shape corresponding to the interior of the tube member. Positioned within the tube member 29 is a weight 34 which engages the upper end of the lubricant stick and urges the same downwardly toward the flange 36 to be lubricated. A suitable flexible member 37 is attached to the upper end of the weight 34 for retracting the same when the lubricant is to be replenished. A stop member 38 is attached to the free end of the flexible member 37 to limit inward movement of the weight 34. Outward movement of the weight 34 is limited by a cap 39 which fits snugly over the uppermost end of the tube 29 as shown. To prevent loss of the cap 39, I attach the same to the tube 29 by means of a chain 41.

From the foregoing description, the assembly and operation of my improved lubricator will be readily understood. With the apparatus mounted on the journal box 12, as shown in Fig. 1, the vertical position of the tube 29 is adjusted by moving the depending leg 14 relative to the support bracket 13 to the desired elevation. The bolts 19 are then secured in place whereby the bracket 16 is locked rigidly to the bracket 13 in the adjusted position. To move the tube 29 toward or away from the flange 36, the bolts 21 are loosened and the member 22 is moved relative to the horizontal leg 17 of the bracket 16 to the desired position. The bolts 21 are then secured in place to lock the member 22 to the horizontal leg 17. To adjust the clamp 28 transversely of the member 22, and to move the tube 29 relative to the clamp, bolts 27 are loosened. The clamp and tube are then moved to position the tube adjacent the flange 36, as shown in Fig. 1. The bolts 27 are then tightened thereby locking the tube 29 in adjusted position.

As shown in Fig. 1, the bracket 26 is so mounted on the member 22 that the tube 29 extends downwardly and inwardly toward the flange 36. With the tube 29 thus mounted, the lubricant stick 33 is urged downwardly toward the flange 36 by the weight 34 into contact with the flange, precisely at the wear point.

From the foregoing, it will be seen that I have devised an improved locomotive flange lubricator which is simple of construction and operation and which may be readily installed on conventional type locomotives. By providing means for adjusting the lubricant holder vertically, horizontally and in a direction toward and away from the flange to be lubricated, the lubricant stick is positioned at the correct position to assure constant feed of the lubricant against the flange with a constant pressure. Furthermore, by providing a polygonal shaped tube for holding a lubricant stick of a corresponding shape, the lubricant stick does not turn within its holder, thereby assuring that the contact end of the lubricant stick maintains a shape corresponding to the wear area of the flange being lubricated. Due to the fact that the contour of the contact end of the lubricant stick does not vary I obtain even distribution of the lubricant on the flange. It will be understood that the end of the tube 29 is positioned close to the flange. In practice I space it from the flange only enough to maintain clearance in extreme lateral position of the wheel, usually, a distance of about one quarter inch. In actual practice, I have found that my improved flange lubricator is satisfactory in every respect and that its use results in prolonging materially the time between turning the locomotive flanges thereof.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In a lubricator for the flange of a locomotive wheel having a journal box, an upstanding support bracket secured rigidly to said journal box, a substantially L-shaped bracket having a horizontal leg and a depending vertical leg extending alongside the upper end of said support bracket, an elongated vertical slot in said vertical depending leg, fastening means passing through said support bracket and said vertical slot and holding said L-shaped bracket in selected vertical positions relative to said support bracket, a second support member extending alongside the horizontal leg of the L-shaped bracket and having an elongated slot adjacent one end thereof, fastening means passing through said horizontal leg and the slot in the second member and holding the same in selected horizontal positions relative to said L-shaped bracket, a third support member secured to the free end of said second member and extending transversely thereof, there being elongated longitudinally extending slots in said third member, a clamp extending alongside said third member, fastening means passing through said clamp and the slots in the third member holding said clamp in selected positions relative to the third member, a tube between said clamp and said third member polygonal as viewed in cross section for receiving a solid type lubricant stick being polygonal as viewed in cross section, a polygonal weight disposed within said tube for engaging an end of the lubricant stick and urging it downwardly toward the locomotive wheel flange, a removable cap fitting over an end of said tube for limiting outward movement of said weight, a flexible member connected at one end to the weight and extending through an aperture in said cap, a stop member attached to the other end of said flexible member for engaging the outer surface of said cap and limiting inward movement of the weight.

References Cited in the file of this patent
UNITED STATES PATENTS

| | | |
|---|---|---|
| 901,284 | Edmunds | Oct. 13, 1908 |
| 1,092,738 | Miner | Apr. 7, 1914 |
| 1,222,341 | Wholey | Apr. 10, 1917 |
| 2,637,411 | Harbison | May 5, 1953 |